United States Patent [19]

Dawson

[11] 4,270,346
[45] Jun. 2, 1981

[54] FUEL CONTROL SYSTEMS FOR GAS TURBINE ENGINES

[75] Inventor: Lindsay G. Dawson, Loughborough, England

[73] Assignee: Rolls-Royce Limited, London, England

[21] Appl. No.: 52,661

[22] Filed: Jun. 27, 1979

Related U.S. Application Data

[63] Continuation of Ser. No. 808,346, Jun. 20, 1977, abandoned.

[30] Foreign Application Priority Data

Jun. 24, 1976 [GB] United Kingdom .............. 26317/76

[51] Int. Cl.³ ............................ F02K 3/00; F02C 9/04
[52] U.S. Cl. ...................................................... 60/243
[58] Field of Search .............. 244/76 B, 182; 60/243, 60/39.28 R

[56] References Cited

U.S. PATENT DOCUMENTS

| | | | |
|---|---|---|---|
| 2,693,081 | 11/1954 | Russ | 60/39.28 R |
| 3,496,721 | 2/1970 | Lloyd et al. | 60/39.28 R |
| 3,530,666 | 9/1970 | Cross et al. | 60/39.28 R |
| 3,713,290 | 1/1973 | Gold | 60/39.28 R |
| 3,813,063 | 5/1974 | Martin | 244/182 |
| 3,898,796 | 8/1975 | Canale et al. | 60/39.28 R |

*Primary Examiner*—Robert E. Garrett
*Attorney, Agent, or Firm*—Cushman, Darby & Cushman

[57] ABSTRACT

A fuel control system for a gas turbine engine for an aircraft comprising two modes of operation, a first mode in which the net thrust of the engine increases with an increase in the forward speed of the aircraft and a second mode in which the net thrust of the engine is caused to decrease with an increase in the forward speed of the aircraft, a selectively operable control device such as a valve or a valve with a least wins device being provided for selecting one of the modes of operation at a time.

8 Claims, 6 Drawing Figures

U.S. Patent   Jun. 2, 1981   Sheet 1 of 2   4,270,346
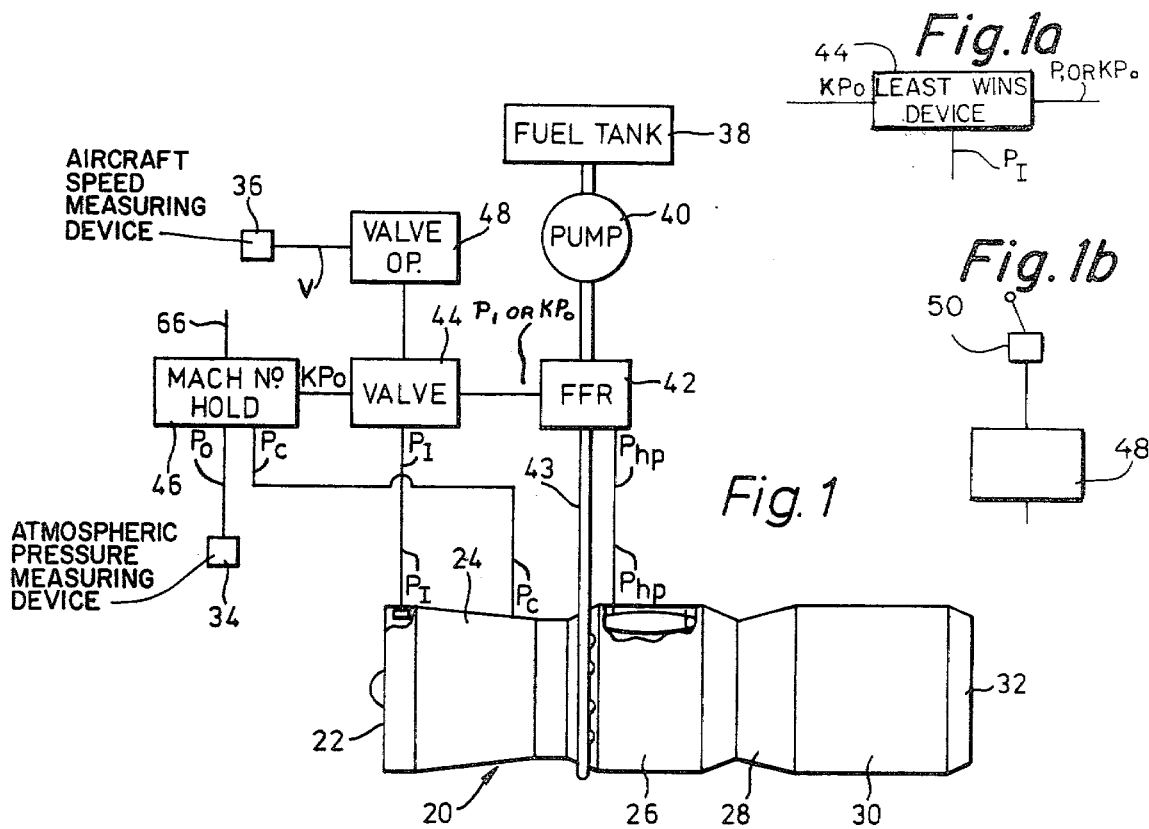
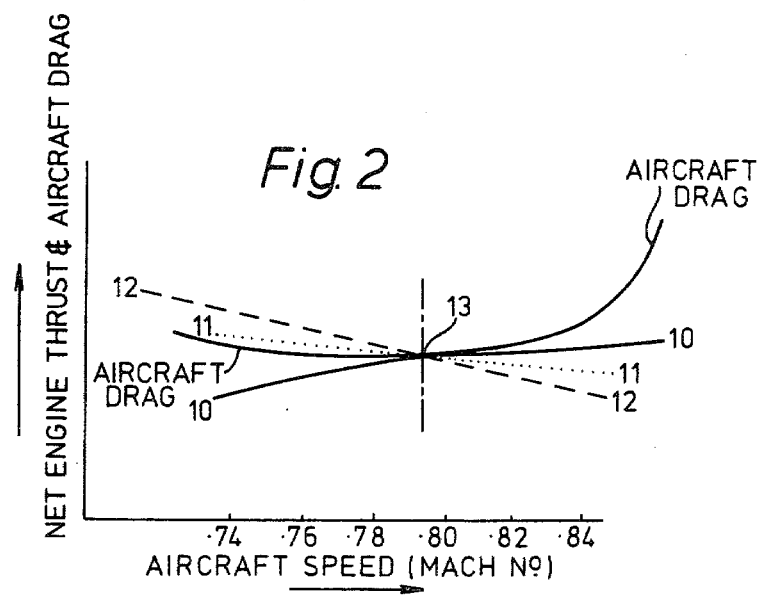

FUEL CONTROL SYSTEMS FOR GAS TURBINE ENGINES

This is a continuation, of application Ser. No. 808,346 filed June 20, 1977, now abandoned.

This invention relates to fuel control systems for gas turbine engines.

The speed stability of some jet aircraft can be unsatisfactory at cruising speeds because the relationship between net thrust of the engines and the total drag of the aircraft at cruise speeds. The actual nature of the drag-speed relationship is not accurately known, but typically, it is a curve having a minimum drag position at which the aircraft is normally designed to cruise.

With most gas turbine engine fuel systems, the net thrust of the engine is aircraft speed sensitive, and can decrease, increase or remain substantially constant with a change in aircraft speed, depending upon the parameters controlling the fuel supply system. The way in which the thrust-speed curve intersects the drag-speed curve affects the speed stability of the aircraft, since to fly the aircraft at a speed around its minimum drag, the net thrust of the propelling engines must balance the drag forces. If the point of intersection varies or is not a definite point the aircraft speed varies and hence the instability.

Since it is desirable for an aircraft to be speed stable at its cruising speed it is an object of the present invention to provide a fuel control system which will vary the thrust of a gas turbine engine with aircraft speed so as to reduce this speed instability problem.

According to the present invention a fuel control system for a gas turbine engine for an aircraft comprises two modes of operation, a first mode in which the net thrust of the engine increases with an increase in the forward speed of the aircraft and a second mode in which the net thrust of the engine is caused to decrease with an increase in the forward speed of the aircraft, means being provided for selecting one of the modes of operation at a time.

Preferably in the first mode of operation the fuel system is controlled by a first signal, the first signal including a factor functionally related to aircraft speed, and in the second mode the fuel system is controlled by a second signal, the second signal including a factor which is functionally related to a substantially constant value, such as an ambient condition.

Preferably the first signal is a function of the ratio between an engine operating pressure and engine inlet pressure, and the second signal preferably is a function of the ratio between said engine operating pressure and atmospheric pressure.

The two said ratios are preferably maintained substantially constant by the fuel control system.

The means for selecting one of the modes of operation preferably comprises a valve which is adapted to supply a function of the engine inlet pressure to the fuel control system for the first mode of operation or a function of atmospheric pressure to the fuel control system for the second mode of operation.

The valve may be operated manually or automatically dependent upon aircraft flight conditions, such as aircraft speed.

Embodiments of the invention will now be described by way of example only with reference to the accompanying drawings in which:

FIG. 1 is a schematic diagram of a gas turbine engine having a fuel control system in accordance with one embodiment of the invention wherein the valve is operated automatically.

FIG. 1a is a fragmentary view of a portion of FIG. 1 showing an alternative embodiment of the invention wherein the valve is also operated automatically.

FIG. 1b is a fragmentary view of a portion of FIG. 1 showing another alternative embodiment of the invention wherein the valve is operated manually.

FIG. 2 is a typical graph of aircraft speed against drag and engine net thrust for a jet aircraft.

Figure 3:
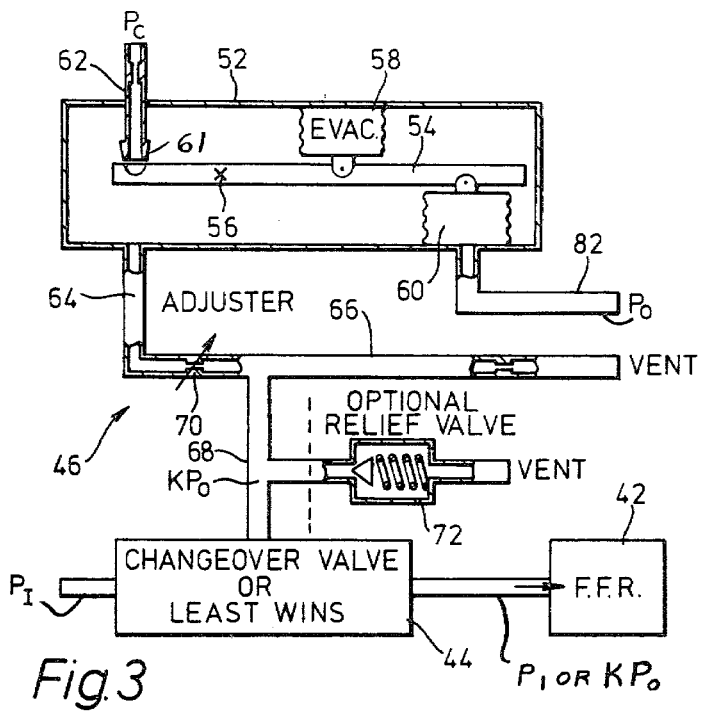
FIG. 3 is a schematic diagram of one embodiment of the fuel control system in accordance with the present invention.

Referring first to FIG. 2, the drag-speed relationship of some aircraft is not generally accurately known but one type of aircraft has a relationship substantially as shown with a minimum value of drag around the cruise speed, which is this case is 0.75 to 0.85 MACH NO. It is known however that the curve is not smooth as shown but has various raised and lowered portions or "bumps" along its length which move or vary in size.

To fly the aircraft at a constant speed around the minimum drag portion of the curve the net thrust of the propelling engines must equal the drag at that speed. The lines 10, 11 and 12 illustrate engine thrust variations with speed at constant throttle settings with three different types of thrust control, the thrust being controlled normally by variation in fuel flow to the engine. It will be seen that all three lines intersect the drag curve at the point 13, the line 10 tangentially, and the lines 11 and 12 actually crossing the drag curve at the point 13. The point 13 is therefore the cruising speed of the aircraft at about 0.79 MACH NO. If the drag curve is not smooth and has bumps along its length and the position and size of these bumps vary then it is possible that the point of intersection of these lines will move, causing speed variations at a constant throttle setting, which is obviously an undesirable feature. It will be seen that aircraft speed in accordance with the line 10 will not be very stable since the point 13 is not very definite on this line and aircraft speed is most affected by variations in the drag curve because of its tangential relationship with the curve. Aircraft speed in accordance with the line 12 will be more stable and least affected by variations in drag because of its fairly large high angle of intersection with the drag curve. Furthermore, it will be seen that using line 12, if the aircraft speed increases, drag exceeds the thrust and the aircraft loses speed back to point 13, and if the aircraft speed decreases, thrust exceeds drag, and the aircraft speed is automatically restored to the point 13 at constant throttle setting. A very stable speed control is thus obtained and it would appear that using a fuel system giving an aircraft speed to net engine thrust in accordance with line 12 is very desirable. A similar result is obtained using line 11, but because of its smaller angle of intersection with the drag curve the point 13 is not very definite and the difference between drag and thrust is smaller. The line is also more affected than the line 12 by any bumps in the drag curve, again due to its small angle of intersection with the drag curve.

The variation of net thrust of a gas turbine engine with aircraft speed can be controlled in various ways, since the net thrust equation of a gas turbine engine is:

net thrust = $(P_N - P_o)A + W(V_j - V)$ where
$P_N$ = Total pressure across propelling nozzle
$P_o$ = atmospheric pressure
$A$ = area of propelling nozzle
$W$ = mass of air passing through engine
$V_j$ = jet velocity at propelling nozzle
$V$ = aircraft speed Thus by varying certain of these factors the net thrust of the engine can be changed for aircraft speed and these factors are changed by the fuel system depending on the parameters controlling the fuel system.

Of the lines 10, 11 and 12 shown in FIG. 2, the line 10 is produced using a fuel control system dependent upon the ratio:

$$\frac{\text{high pressure compressor delivery pressure}}{\text{engine inlet pressure}} \quad (\text{or } \frac{P_{HP}}{P_I})$$

which the fuel system attempts to maintain constant.

Thus as aircraft speed increases $P_I$ increases and the fuel control system causes $P_{HP}$ to increase in an effort to maintain the ratio $(P_{HP}/P_I)$ constant. An increase in $P_{HP}$ causes an increase in shaft speed of the engine with consequent increases in $P_N$, $W$, $V_j$ and $V$, giving a final result of a slight increase in net thrust per speed of the aircraft.

Line 11 is produced using a fuel system which gives a constant engine speed for each throttle opening. As aircraft speed increases, $P_I$ increases with consequent slight increases in $P_N$, $W$ and $V_j$. $V$ increases sufficiently, however to cause a slight reduction in net thrust for an aircraft speed increase.

Line 12 is produced using a fuel control system dependent again on a pressure ratio, $$\frac{\text{H.P. Compressor delivery pressure}}{\text{atmospheric pressure}} \quad (\text{or } \frac{P_{HP}}{P_o})$$

which, again, the system tries to maintain constant. Thus with an aircraft speed increase, $P_I$ increases and $P_{HP}$ increases. The fuel system reduces fuel flow to restore $P_{HP}$ (since $P_o$ is constant), with a decrease in shaft speed of the engine. The only substantial change in the net thrust equation is an increase in $V$ with a definite reduction of net thrust.

As mentioned earlier it would appear that using a fuel system giving an aircraft speed to net engine thrust in accordance with line 12 is very desirable, however the ratio $(P_{HP}/P_o)$ is not suitable for all operating conditions of an aircraft engine. For example at lower aircraft speeds, such as take off or climb, $(P_{HP}/P_o)$ causes engine thrust to decrease at a constant throttle setting as opposed to $(P_{HP}/P_I)$ which gives virtually a constant thrust for a constant throttle setting at lower aircraft speeds. Furthermore, $(P_{HP}/P_I)$ causes substantially constant thrust for varying ambient temperatures as opposed to the constant engine speed type of control (line 11) which causes a decrease in thrust as ambient temperature increases.

The use of the ratio $(P_{HP}/P_I)$ therefore gives highly desirable performance characteristics, except at cruise speed where the speed instability occurs. In the present invention therefore, two modes of operation are used: the ratios $(P_{HP}/P_I)$ and $(P_{HP}/P_o)$, the $(P_{HP}/P_o)$ control being substituted for $(P_{HP}/P_I)$ at around cruising speed thus giving the engine the advantages of both types of control.

In FIG. 1 there is shown a gas turbine engine 20 having an air inlet 22, compressor means 24, combustion equipment 26, turbine means 28, a jet pipe 30 and a propelling nozzle 32. Measurements are taken of air inlet pressure ($P_I$), intermediate compressor delivery pressure ($P_c$), compressor delivery pressure ($P_{HP}$), atmospheric pressure ($P_o$) from a measuring device 34 and aircraft speed (V) from a measuring device 36. The fuel control system consists of a fuel tank 38 a pump 40, a fuel flow regulator 42 and a fuel manifold 43 which supplies a number of fuel injecting nozzles (not shown) in the combustion equipment 26. Except at about cruise speed the fuel flow regulator 42 is normally supplied with the values of $P_{HP}$ and $P_I$ which are utilised as described above to control the fuel flow to the fuel nozzles, the value $P_I$ being supplied via a valve 44. A MACH NO. hold unit 46 is supplied with the values of $P_o$ and $P_c$, $P_c$ being used to amplify $P_o$ to a usable value $KP_o$. The value of $KP_o$ is also supplied to the valve 44. Thus by changing the valve 44 either $P_I$ or $KP_o$ can be supplied to the fuel flow regulator 42. The valve 44 can consist of a lowest wins device, as shown in FIG. 1a so that the lower of $KP_o$ or $P_I$ is supplied to the regulator 42 or the valve 44 can be controlled in dependence upon aircraft speed by means of an operating device 48 which is supplied with the valve V from the measuring device 36, as shown in FIG. 1, or the valve 44 can be controlled manually by a pilot's switch 50, as shown in FIG. 16.

FIG. 3 shows the MACH NO. hold unit 46 in more detail. It consists of a chamber 52 in which is mounted a lever 54 which is pivoted on a horizontal axis 56. Connected to the lever 54 is an evacuated bellows 58, and a bellows 60 which is supplied with air at atmospheric pressure $P_o$ along a duct 82. At the opposite end of the lever 54 is a valve 61 which is adapted to close off a supply duct 62 of air at pressure $P_c$ (intermediate compressor delivery pressure).

As $P_o$ increases the lever 54 rotates in an anticlockwise direction about its pivot 56, thus opening the end of the supply duct 62 and allowing a flow of $P_c$ air into the chamber 52. Similarly as $P_o$ reduces the lever rotates clockwise and eventually stops the flow of $P_c$ air into the chamber 52. The pressure in the chamber 52 is therefore proportional to $P_o$, but has a higher value, since $P_o$ is not normally high enough to be used in the fuel flow regulator 42. The air in the chamber 52 then flows through ducts 64 and 68 into the valve 44, the pressure of air entering the valve 44 being $KP_o$, the valve of K being set by a variable orifice 70. A restricted vent duct 66 is provided for the times $KP_o$ is not in use, as is a relief valve 72 should the pressure $KP_o$ become excessive. The changeover valve 44 can be a simple piston and cylinder arrangement or a least wins device of known type. The lesser value of $P_I$ or $KP_o$ is used since the aircraft needs to be on the least thrust for any particular throttle setting. Thus up to aircraft cruise speed $(P_{HP}/P_I)$ is fed to the fuel flow regulator 42 on thrust lines parallel, to, but with greater thrust than the line 10, to overcome the higher drag at lower speeds, and as $P_I$ increases and becomes greater than $KP_o$, $KP_o$ is automatically fed to the regulator 42 and the engine is controlled by the ratio $(P_{HP}/KP_o)$ on a line parallel to line 12, or on the line 12 depending on the throttle setting, and actually on the line 12 at cruise speed.

The value of K is ideally the ram ratio of ($P_I/P_o$) and is only correct for one MACH NO. Thus a value of K of 1.5 is used in the described example which corresponds to approximately MACH 0.79, or the point 13 on FIG. 2. Thus ($P_{HP}/KP_o$) control is switched in at around the point 13.

Figure 4:
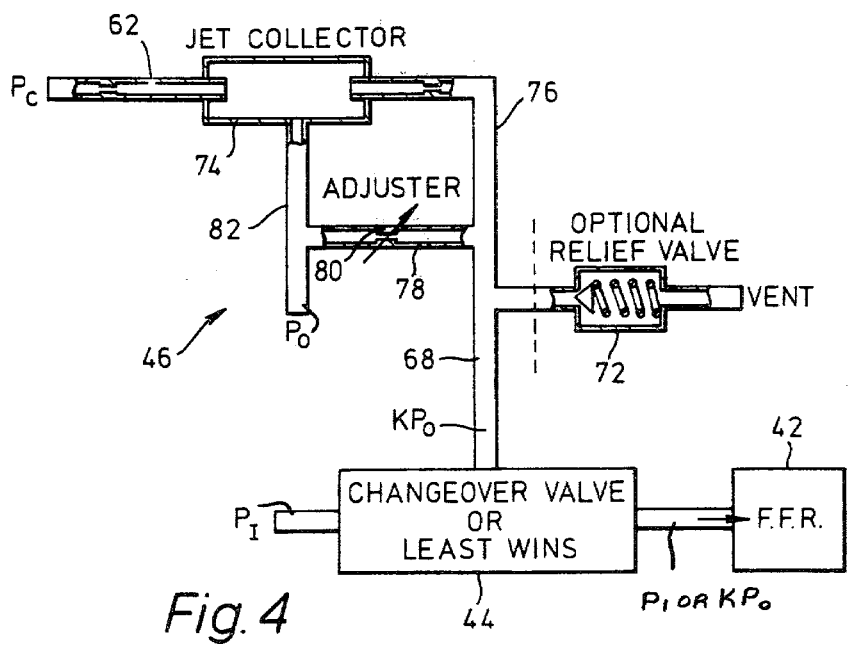
FIG. 4 is a schematic diagram of an alternative embodiment of the invention.

FIG. 4 is an alternative arrangement of the MACH NO. hold unit 46 and is a fluidic device without moving parts. The unit consists of a jet collector 74 to which $P_c$ is supplied from the duct 62, and $P_o$ air is supplied from the duct 82. Out of the duct 76 is a flow of air at a pressure proportional to $P_o$. A duct 80 connecting ducts 82 and 76 includes a variable orifice 78 for the selection of the value of K, and the pressure $KP_o$ is delivered to the valve 44 along the duct 68 as before. The pressure relief valve 72 is also provided in the duct 68.

Whilst the invention has been described using $P_{HP}$ (high pressure compressor delivery pressure) as a controlling parameter, and $P_c$ (intermediate compressor delivery) in the unit 46, any pressures in the engine which vary according to the engine operating condition could be used, such as, in a three shaft engine: low pressure compressor delivery, H.P. turbine entry pressure, H.P. turbine exit, I.P. turbine exit, L.P. turbine exit, jet pipe pressure or propelling nozzle pressure. However $P_{HP}$ is preferred since it is the highest pressure and can make for more accurate control.

I claim:

1. A fuel control system for a gas turbine engine having predetermined engine parameters and used with an aircraft, said fuel control system comprising: a fuel flow regulator for varying flow of fuel to the engine in accordance with certain of the predetermined engine parameters, said fuel flow regulator having a normal mode of operation in which said regulator varies flow of fuel in accordance with a first set of the engine parameters supplied thereto to produce a thrust level from the engine which is constant or increases with increasing aircraft speed, said first set including a parameter whose value varies with aircraft speed, and said regulator having a cruise mode of operation in which said regulator varies flow of fuel in accordance with a second set of engine parameters supplied thereto to produce a thrust level from the engine which decreases with increasing aircraft speed, said second set including a parameter whose value does not vary with aircraft speed and which replaces said parameter whose value varies with aircraft speed; and control means for selectively supplying one of said first and second set of engine parameters to said fuel flow regulator to provide for said normal or said cruise mode of operation.

2. A fuel control system as claimed in claim 1 and in which said parameter whose value does not vary with aircraft speed comprises an ambient condition.

3. A fuel control system as claimed in claim 2 and in which said first set of engine parameters comprises a function of an engine operating pressure and an engine inlet pressure and said second set of parameters comprises a function of an engine operating pressure and atmospheric pressure.

4. A fuel control system as claimed in claim 3 and in which said fuel flow regulator varies the flow of fuel to the engine in said normal mode so as to maintain a ratio of said engine operating pressure to said engine inlet pressure substantially constant, and in said cruise mode to maintain a ratio of said engine operating parameter to said atmospheric pressure substantially constant.

5. A fuel control system as claimed in claim 4 in which said control means comprises a valve to supply said engine inlet pressure to said fuel flow regulator in said normal mode and to supply a pressure proportional to said atmospheric pressure to said fuel flow regulator in said cruise mode.

6. A fuel system as claimed in claim 5 wherein said valve includes means to operate said valve manually.

7. A fuel control system as claimed in claim 5 and in which said valve includes a least wins device to supply whichever of the engine inlet pressure and the pressure proportional to atmospheric pressure is the lesser to the fuel flow regulator.

8. A fuel control system as claimed in claim 5 and comprising a valve operating device and a measuring device to feed to said valve operating device an indication of aircraft airspeed, said valve operating device controlling said valve to a changeover between said normal mode and said cruise mode at a predetermined value of airspeed.

* * * * *